United States Patent [19]
Tanaka et al.

[11] Patent Number: 5,871,233
[45] Date of Patent: Feb. 16, 1999

[54] STEERING DEVICE EQUIPPED WITH AIR BAG

[75] Inventors: Hideki Tanaka; Katsuo Sakurai, both of Niwa, Japan

[73] Assignee: Kabushiki Kaisha Tokai-Rika-Denki-Seisakusho, Niwa, Japan

[21] Appl. No.: 751,678

[22] Filed: Nov. 18, 1996

[30] Foreign Application Priority Data

Nov. 24, 1995 [JP] Japan ................................. 7-305370

[51] Int. Cl.$^6$ .................................................. B62D 1/16
[52] U.S. Cl. .................................... 280/777; 280/780
[58] Field of Search .................................. 280/777, 780

[56] References Cited

U.S. PATENT DOCUMENTS

| | | | |
|---|---|---|---|
| 3,923,319 | 12/1975 | Nonaka et al. | 280/777 |
| 4,946,195 | 8/1990 | Ioka et al. | 280/777 |
| 4,968,058 | 11/1990 | Jones | 280/777 |
| 5,035,446 | 7/1991 | Arvidsson | 280/775 |
| 5,054,810 | 10/1991 | Backhaus et al. | 280/777 |
| 5,193,848 | 3/1993 | Faulstoh | 280/777 X |
| 5,295,712 | 3/1994 | Omura | 280/777 |
| 5,346,255 | 9/1994 | Schafer et al. | 280/777 X |
| 5,417,452 | 5/1995 | Khalifa et al. | 280/777 |
| 5,507,521 | 4/1996 | Steffens, Jr. | 280/777 |
| 5,626,364 | 5/1997 | Nakamura | 280/777 |

FOREIGN PATENT DOCUMENTS

| | | |
|---|---|---|
| B2-54-12688 | 5/1979 | Japan . |
| A-64-52578 | 2/1989 | Japan . |
| B2-260550 | 12/1990 | Japan . |
| B2-3-48068 | 7/1991 | Japan . |
| B2-4-24262 | 4/1992 | Japan . |
| A-4-238761 | 8/1992 | Japan . |
| A-117612 | 5/1995 | Japan . |
| A-7-257394 | 10/1995 | Japan . |

*Primary Examiner*—Peter A. Nelson
*Attorney, Agent, or Firm*—Oliff & Berridge, PLC

[57] ABSTRACT

A steering device equipped with an air bag, in which the air bag is completely inflated and expanded in a state in which a steering wheel has been moved in a direction toward a driver when a vehicle suddenly decelerates. The steering device equipped with the air bag has a driving device which tilts the steering wheel toward the driver when the vehicle suddenly decelerates and includes a pawl, a tilt cam, a connected member, a wire, and a pretensioner and a holding device which maintains a tilted state of the steering wheel and includes a lock member and a lock plate. When the vehicle suddenly decelerates, the wire is pulled, the tilt cam rotates, and the pawl moves away from a steering support. The steering wheel is tilted a maximum amount toward the driver, this state is maintained by the holding device, and the air bag inflates and expands. Accordingly, the steering wheel is oriented toward the driver and an expanded air bag is oriented toward the driver such that kinetic energy of the driver is effectively absorbed.

19 Claims, 11 Drawing Sheets

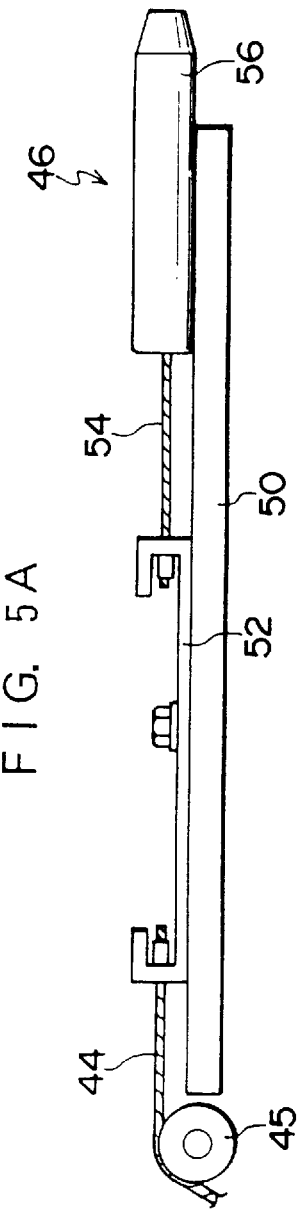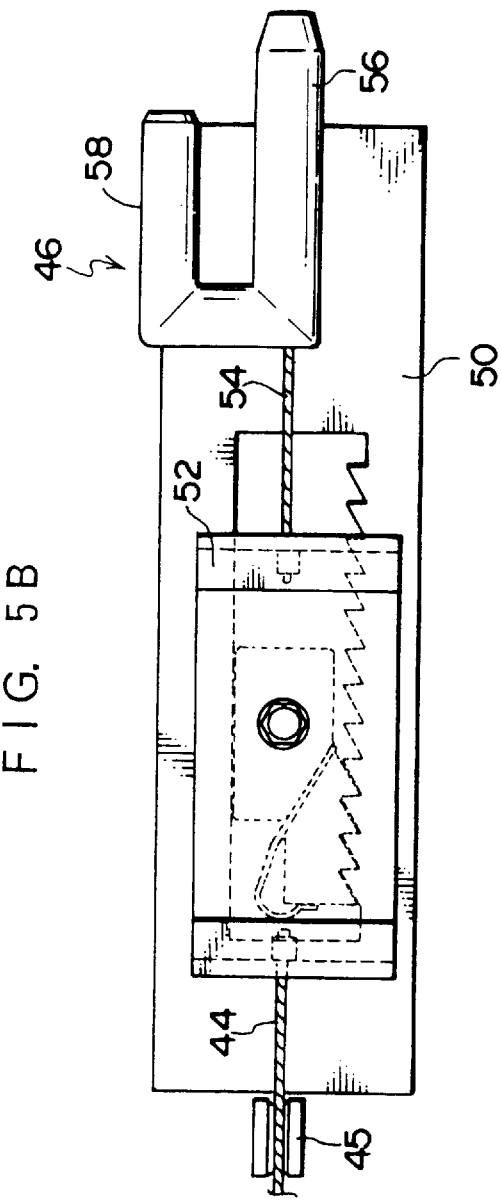

F I G. 11
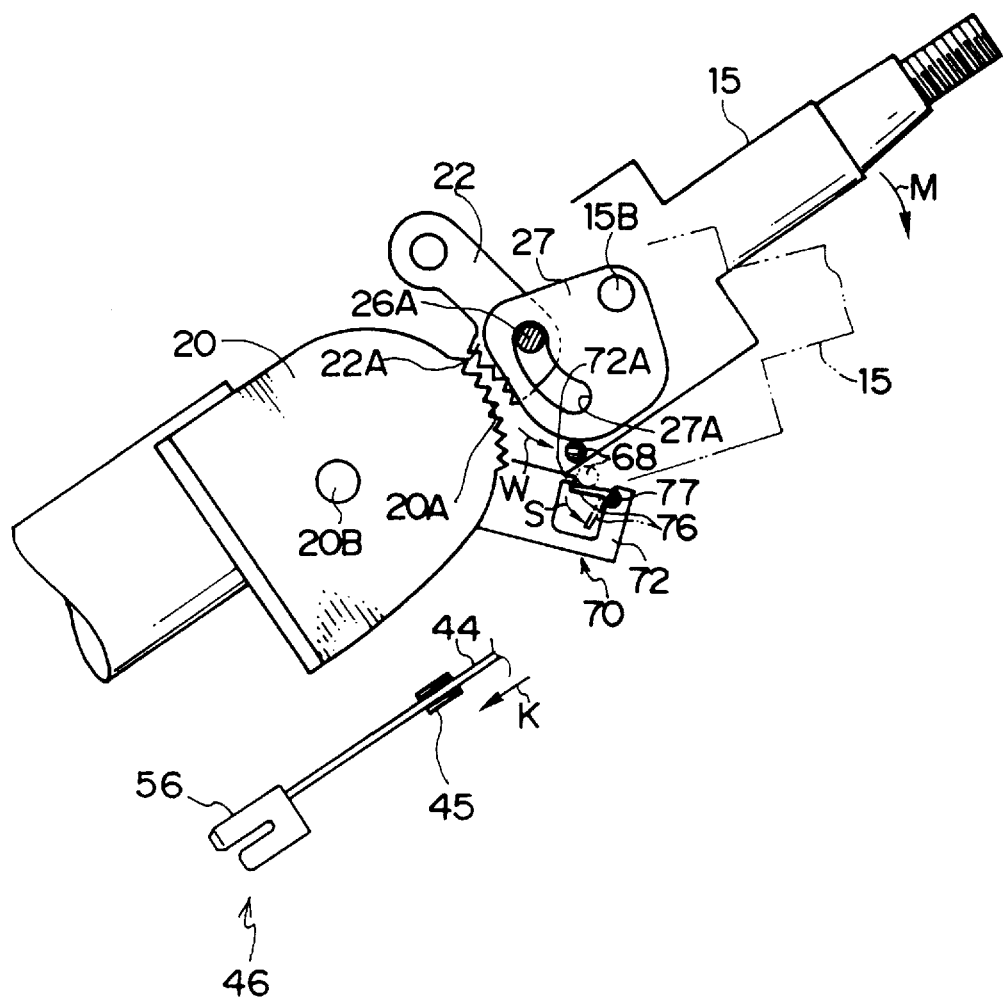

STEERING DEVICE EQUIPPED WITH AIR BAG

BACKGROUND OF THE INVENTION

1. Field of the Invention

The present invention relates to a steering device equipped with an air bag which expands at the time a vehicle suddenly decelerates.

2. Description of the Related Art

An air bag, which is used to protect a vehicle occupant, is often provided in the steering wheel of a vehicle such as a one-box car (i.e., an automobile in which the engine space, dwelling space, and trunk space are formed integrally), i.e., such as a truck or a cab-over vehicle.

Compared with a standard passenger car, in a one-box car, the angle of the steering shaft with respect to a horizontal plane is relatively large, and the axis of the steering wheel is oriented upward. As a result, a large-capacity air bag or a highly rigid air bag is needed in order to absorb the kinetic energy of the driver.

SUMMARY OF THE INVENTION

In view of the aforementioned, an object of the present invention is to provide a steering device equipped with an air bag, which is suitable for a vehicle having a steering wheel with a relatively large steering angle.

The present invention is a steering device equipped with an air bag, comprising a steering wheel at which an air bag, which expands when a vehicle suddenly decelerates, is provided; driving means for tilting the steering wheel toward a driver when the vehicle suddenly decelerates; and holding means for maintaining a tilted state of the steering wheel.

When the vehicle suddenly decelerates, the steering wheel is oriented toward the driver, and this state is maintained. The expanded air bag is oriented toward the driver such that the kinetic energy of the driver is effectively absorbed.

Accordingly, in accordance with the present invention, when the vehicle suddenly decelerates, the air bag can be oriented toward the driver without the structure of the air bag itself being changed.

The above and other objects, features and advantages of the present invention will become apparent from the following description and the appended claims taken in conjunction with the accompanying drawings in which preferred embodiments of the present invention are shown by way of illustrative example.

BRIEF DESCRIPTION OF THE DRAWINGS

The invention will now be described with reference to the accompany in g drawings wherein:

FIG. 5A is a plan view illustrating a lock mechanism of the pretensioner mechanism of the first embodiment;

FIG. 5B is a rear view illustrating the lock mechanism of the pretensioner mechanism of the first embodiment;

FIG. 11 is a schematic side view illustrating a state in which a pretensioner of the second embodiment is operated and a column upper tube (upper shaft) is rotated.

DESCRIPTION OF THE PREFERRED EMBODIMENTS

A first embodiment of the present invention is illustrated in FIGS. 1 through 9A, 9B, 9C. The present embodiment is an example in which the present invention is applied to a cab-over vehicle.

Figure 1:
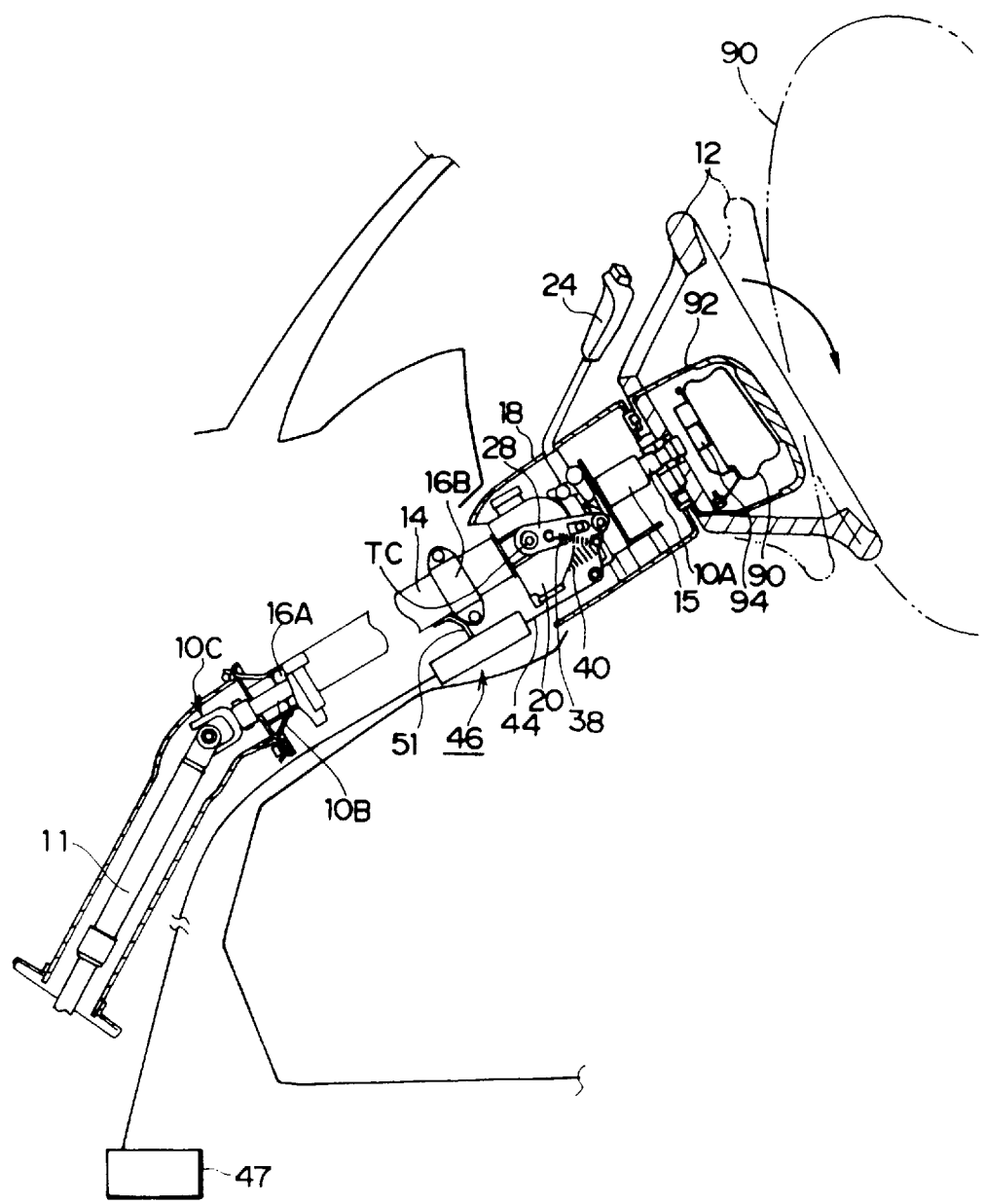
FIG. 1 is a schematic side view of a steering supporting device of a first embodiment of the present invention.

FIG. 1 is a schematic side view illustrating a steering supporting device, and FIGS. 2 through 7A, 7B are views illustrating main portions of a steering angle varying mechanism.

As illustrated in FIG. 1, a steering shaft is divided in two into an upper shaft 10A and a lower shaft 10B. The upper shaft 10A and the lower shaft 10B are connected by an unillustrated joint (whose center of rotation is axis TC which extends horizontally). A steering wheel 12 is connected to the upper end of the upper shaft 10A, and a steering column cover 18 is mounted to the upper end of the upper shaft 10A. An intermediate shaft 11 is connected to the bottom end of the lower shaft 10B via a universal joint 10C.

A tilt adjusting mechanism serving as the tilting means of the steering wheel 12 is disposed within the steering column cover 18. The upper shaft 10A tilts around the axis TC via a joint.

Description of Tilt Adjusting Mechanism

The tilt adjusting mechanism will be described hereinafter on the basis of FIGS. 1 through 3A, 3B.

Figure 2:
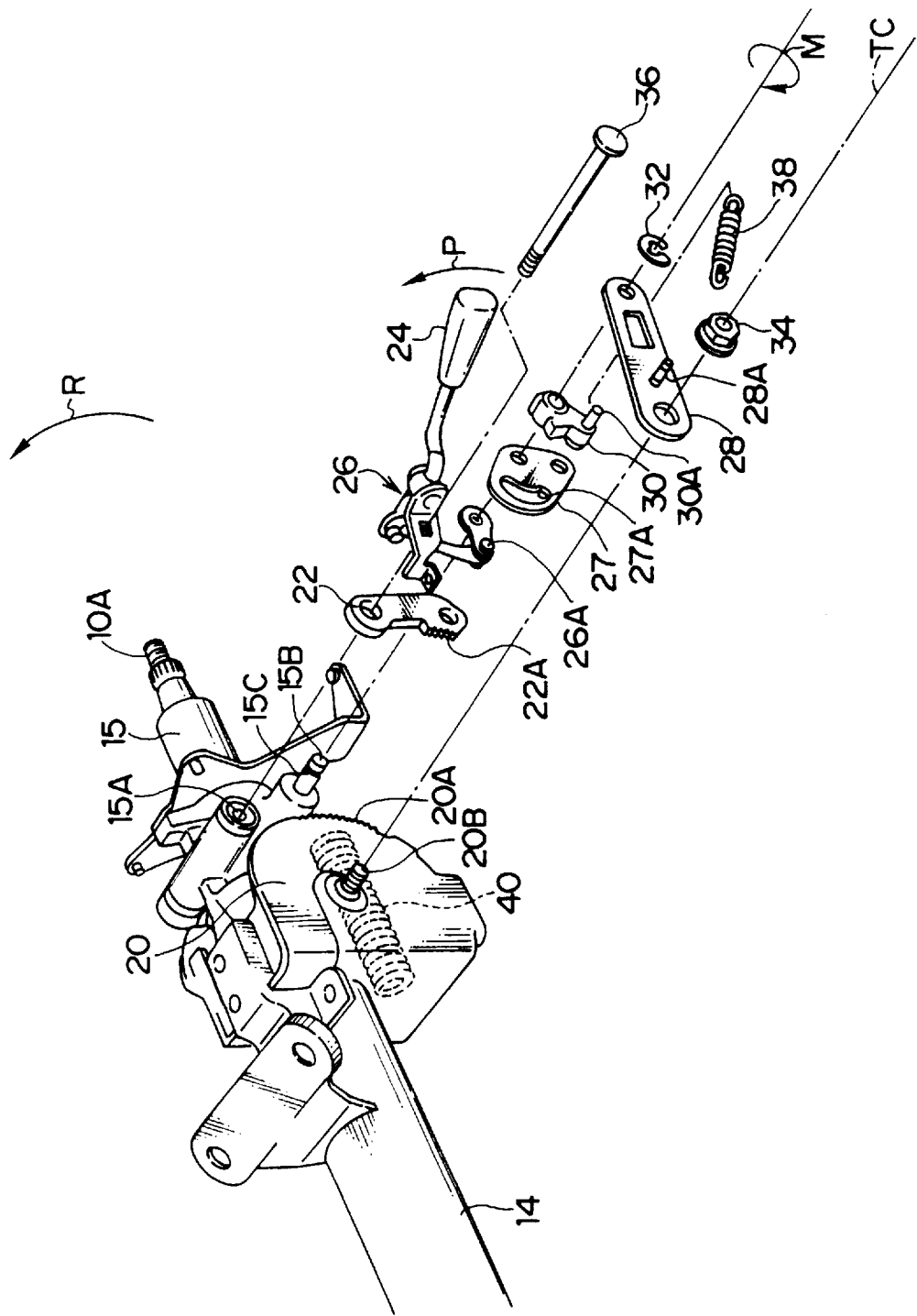
FIG. 2 is an exploded perspective view illustrating main portions of a steering angle varying mechanism of the first embodiment.

As illustrated in FIG. 1, a steering support 20 is fixed to the steering wheel 12 side of a steering column tube 14. A column upper tube 15 is pivotally-supported at the steering support 20 around the center of rotation TC. As illustrated in FIG. 2, the upper shaft 10A is pivotally-supported at the column upper tube 15. A screw hole 15A and a mounting shaft 15B are formed at one vehicle transverse direction end of the column upper tube 15. A slit 15C is formed in the distal end of the mounting shaft 15B along the peripheral direction thereof.

Ratchet teeth 20A and a screw shaft 20B, which is coaxial with the center of rotation TC, are formed at the steering support 20. The screw shaft 20B and the mounting shaft 15B of the column upper tube 15 are separated by a predetermined interval.

A bolt 36 screws with the screw hole 15A so as to pivotally-support a pawl 22 which forms a portion of the driving means. Ratchet teeth 22A are formed at the pawl 22 so as to oppose the ratchet teeth 20A of the steering support 20. The tilt/rotation positions of the column upper tube 15 and the upper shaft 10A around the center of rotation TC are fixed due to the ratchet teeth 22A meshing with the ratchet teeth 20A.

The mounting shaft 15B is inserted through and fixed to a link mechanism 26 which connects a tilt lever 24. A pin 26A is formed at the link mechanism 26. The pin 26A is inserted into and connected to an elongated cam hole 27A formed in a tilt cam 27 which forms a portion of the driving means. The tilt cam 27 is connected to a pawl stopper 30, and movement of the tilt cam 27 is restricted by the pawl stopper 30. More specifically, the mounting shaft 15B is inserted into the tilt cam 27 and the pawl stopper 30, and the tilt cam 27 and the pawl stopper 30 are rotatable around the mounting shaft 15B.

A tilt arm 28 which connects the mounting shaft 15B and the screw shaft 20B is attached to the mounting shaft 15B and the screw shaft 20B. The tilt arm 28 connects the steering support 20 and the column upper tube 15. More specifically, the tilt arm 28 is mounted to the mounting shaft 15B by a snap ring 32 being attached to the slit 15C, and the tilt arm 28 is mounted to the screw shaft 20B by a nut 34 being attached to the screw shaft 20B. The bolt 36 is attached to the screw hole 15A with the pawl 22 and the link mechanism 26 being disposed therebetween.

Hooking portions 28A, 30A are formed at the tilt arm 28 and the pawl stopper 30, respectively. The ends of a tension spring 38 are hooked on the hooking portions 28A, 30A. Due to the urging force of the tension spring 38, the pawl 22 is always urged in a direction of being pushed clockwise (in the direction of arrow M in FIG. 3A) toward the ratchet teeth 20A.

Figure 3A:
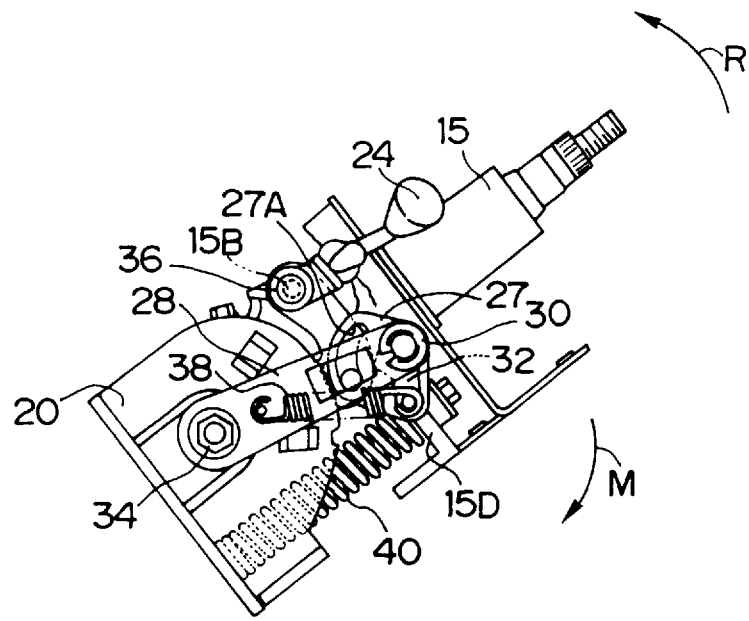
FIG. 3A is a side view illustrating main portions of the steering angle varying mechanism of the first embodiment.

As illustrated in FIG. 2, a compression spring 40 (shown by the broken line in FIG. 2) is disposed at the bottom portion of the steering support 20 so as to abut an abutment portion 15D which is formed at the column upper tube 15 and shown in FIG. 3A. Due to the urging force of the compression spring 40, the column upper tube 15 is urged counterclockwise (in the direction of arrow R in FIG. 3A).

Figure 3B:
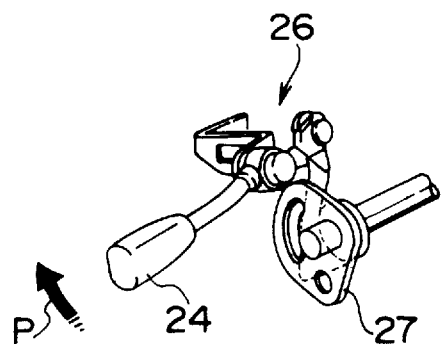
FIG. 3B is a perspective view illustrating a portion connected to a tilt lever.
Figure 4:
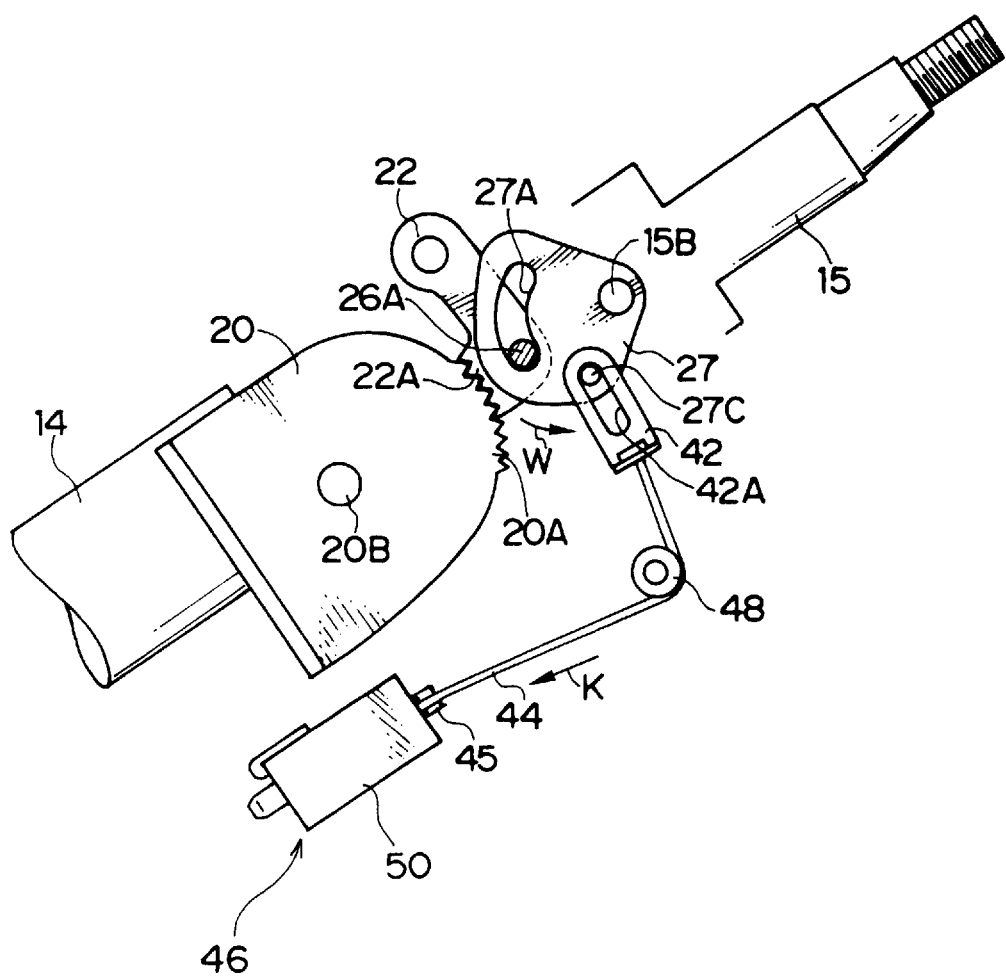
FIG. 4 is a schematic side view illustrating a pretensioner mechanism of the first embodiment.

Accordingly, as shown in FIG. 3B, when the tilt lever 24 is rotated clockwise (in the direction of arrow P in FIG. 3B), the link mechanism 26 moves counterclockwise (in the direction opposite to the direction of arrow P in FIG. 3B), the tilt cam 27 rotates counterclockwise in FIG. 4, and the pawl 22 rotates in a direction of moving the ratchet teeth 22A away from the ratchet teeth 20A due to the cam operation of the cam hole 27A and the pin 26A.

Mechanism Relating to Pretensioner

Hereinafter, the mechanism relating to a pretensioner 46, which serves as a driving means, will be described. As illustrated in FIG. 4, a pin 27C projects from the tilt cam 27 at a region of the tilt cam 27 which is lower than the mounting shaft 15B and toward the cam hole 27A side with respect to the mounting shaft 15B. The pin 27C is inserted into and connected with a connecting member 42 which is rectangular and plate-shaped and connects the pretensioner 46. Note that FIG. 4 only illustrates the main portions of the pretensioner mechanism which serves as the driving means of the present embodiment.

An elongated hole 42A is formed along the longitudinal direction of the connecting member 42 in a region of the connecting member 42 corresponding to the pin 27C. The pin 27C is inserted into the elongated hole 42A. An unillustrated stopper for preventing the pin 27C from being pulled out from the elongated hole 42A is formed at the pin 27C. The connecting member 42 is disposed so as to be oriented in a direction substantially orthogonal to the axis of the steering column tube 14 in FIG. 4. In a case in which tensile force is applied to the pin 27C from the connecting member 42, the tilt cam 27 rotates in the direction of arrow W around the screw shaft 15B, which is the center of rotation of the tilt cam 27, due to the force applied to the pin 27C.

The reason why the elongated hole 42A is used to connect the pin 27C is so that the connecting member 42 does not hinder the rotation of the tilt cam 27 around the screw shaft 15B in a case in which ordinary tilt operation is carried out around the screw shaft 15B. Namely, even if the pin 27C moves together with the tilt cam 27 at the time of ordinary tilt operation, the pin 27C can move with play along the elongated hole 42A with the connecting member 42 in a stopped state.

One end of a wire 44 is connected to one end of the connecting member 42. The pretensioner 46 is connected to the other end of the wire 44. A pulley 48 is disposed at the connecting member 42 side of the wire 44. The pulley 48 converts the direction in which the pretensioner 46 is disposed with respect to the connecting member 42 to the same direction as the axis of the steering column tube 14. The wire 44 is trained around the pulley 48. As shown in FIG. 1, an electronic collision acceleration sensor 47 is connected to the pretensioner 46. The pretensioner 46 is operated by the sensor 47 at the time of a sudden deceleration of the vehicle.

Figure 6:
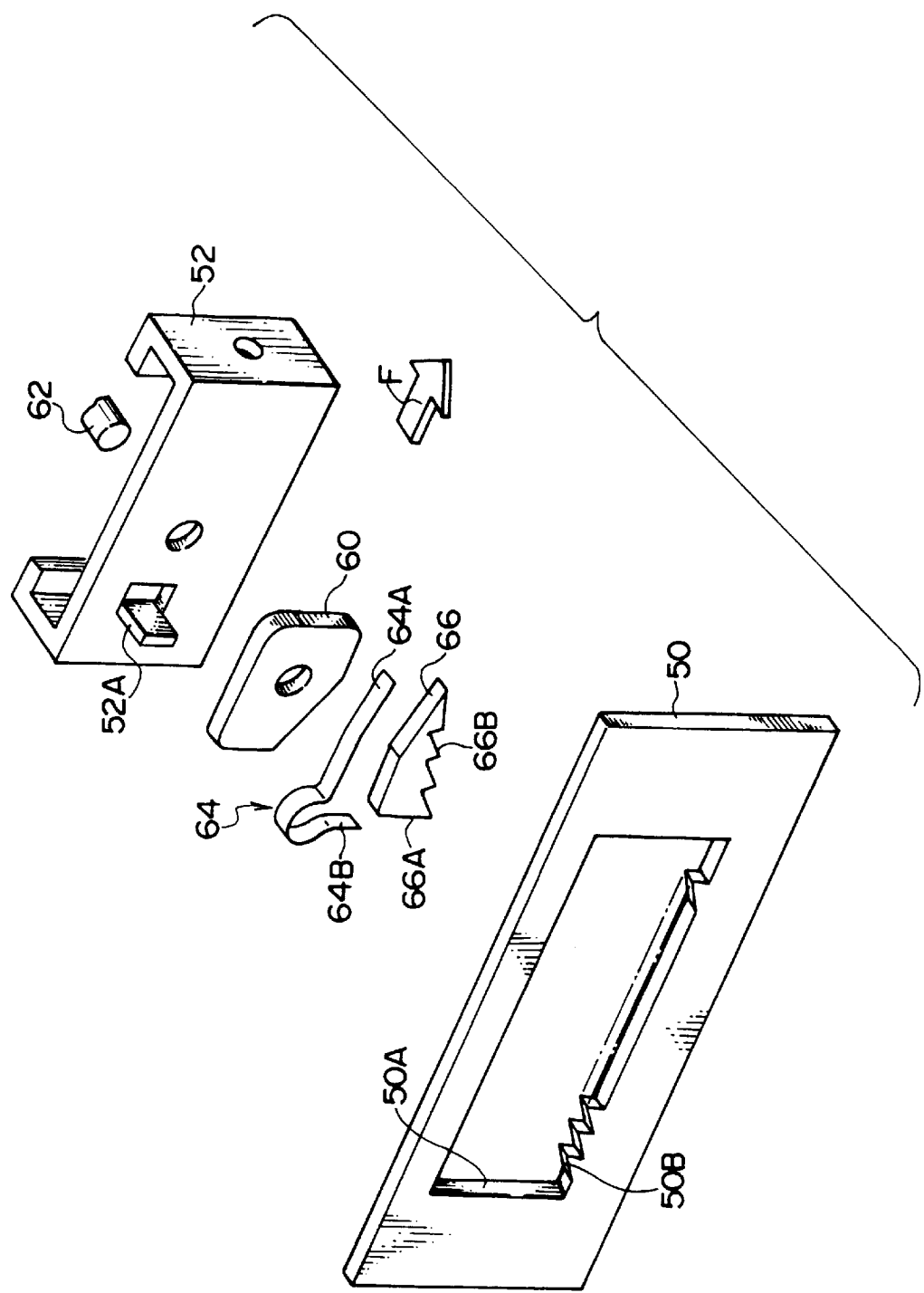
FIG. 6 is an exploded perspective view of the lock mechanism of the first embodiment.

As illustrated in FIGS. 5A, 5B and 6, the pretensioner 46 is provided with a reversal-preventing lock mechanism which will be described hereinafter. A rectangular, flat-plate-shaped base 50 is fixed to a bracket 51 illustrated in FIG. 1, and a slider 52 is slidably disposed at the base 50. As shown in FIGS. 5A and 5B, the other end of the wire 44 is connected to one end of the slider 52. One end of a wire 54 is connected to the other end of the slider 52. The other end of the wire 54 is connected to an unillustrated piston which slides within a cylinder 56. A connected portion 58 is connected to the cylinder 56. An unillustrated detonating device, powder and the like, which are activated upon a signal from the sensor 47, are disposed within the connected portion 58. As shown in FIGS. 5A and 5B, a pulley 45 is disposed at the other end side of the wire 44. Due to the pulley 45, the respective portions of the wire 54 and the wire 44 at the base 50 side are set on the same line, and the pulling in of the wire 44 is made smooth.

As illustrated in FIG. 6, a rectangular opening portion 50A is formed in the base 50 along the sliding direction of the slider 52. A lock member 60, which is inserted into the opening portion 50A and forms a portion of a holding means, is connected to the slider 52 via a pin 62. Accordingly, when the slider 52 moves, the lock member 60 moves integrally with the slider 52.

A lock plate 66 which forms a portion of the holding means is, via a plate spring 64, able to move slightly relatively to and together with the lock member 60. One end portion 64A of the plate spring 64 is fixed to the lock member 60 by an unillustrated caulking means or the like. Another end portion 64B of the plate spring 64 pushes a rear portion 66A of the lock plate 66.

Ratchet teeth 66B are formed at the bottom portion of the lock plate 66. Ratchet teeth 50B are formed in the inner periphery of the opening portion 50A of the base 50 which corresponds to the ratchet teeth 66B. Movement of the slider 52 is restricted by the ratchet teeth 50B, 66B meshing together. More specifically, in the state in which the ratchet teeth 66B and the ratchet teeth 50B are meshed together, movement of the lock plate 66 in a direction of being pulled by the wire 54 (the direction of arrow F) is possible due to the bending of the plate spring 64, and movement of the lock plate 66 in the direction opposite thereto is prevented. Thus, the lock plate 66 is structured so as to be able to move in one direction.

A stopper 52A, which is formed as if a portion of the slider 52 were cut and bent outwardly, is formed at the slider 52. The stopper 52A abuts the other end portion 64B of the plate spring 64. The stopper 52A prevents the other end portion 64B from being separated by more than a predetermined distance from the rear portion 66A of the lock plate 66.

A joint or a linking member or the like of a rack-and-pinion type gear box, which serves as a steering device, or a link-type steering device is connected to the bottom end of the lower shaft 10B. The intermediate portion of the lower shaft 10B is supported, via the steering column tube 14, at the vehicle body by a pair of supporting members 16A, 16B which are disposed above and beneath the steering column tube 14.

As illustrated in FIG. 1, a pad 92 is disposed at the steering wheel 12. An air bag 90 is accommodated in a folded-up state in the pad 92. The pad 92 may be supported at the upper shaft 10A via a gear or the like so as to not rotate integrally with the steering wheel 12, i.e., the pad 92 may be a so-called stationary pad. As illustrated by the imaginary line in FIG. 1, when the air bag 90 is in an expanded state, the air bag 90 is substantially symmetrical with respect to the steering axis as seen from the side. In this expanded state, a flat surface of the air bag 90 is oriented toward the rear of the vehicle.

Further, as shown in FIG. 1, a vehicle sudden deceleration sensor 94 for expanding the air bag 90, as well as a combustible gas generating agent and the like which are activated by the sensor 94, are disposed within the pad 92. The sensor 94 is connected to the sensor 47. When either of these sensors 94, 47 detects a sudden deceleration of the vehicle, the air bag 90 is inflated and expanded.

A control device, which detects the signals of the sensors 47, 94 and actuates the gas generating agent, tilts the air bag 90 before the air bag 90 is completely inflated and expanded, e.g., inflates and expands the air bag 90 after orienting the steering wheel 12 completely in the direction of the driver. Further, the pad 92 may be a pad which rotates integrally with the steering wheel 12 rather than a stationary-type pad.

Operation of the present first embodiment will be described hereinafter.

First, tilting operation at the tilt lever 24 will be described. As illustrated in FIG. 3A, because the pawl stopper 30 pushes against the reverse surface of the pawl 22 due to the tension spring 38, the ratchet teeth 22A of the pawl 22 illustrated in FIG. 4 mesh with the ratchet teeth 20A of the steering support 20, and rotation of the column upper tube 15 is prevented.

Figure 7A:
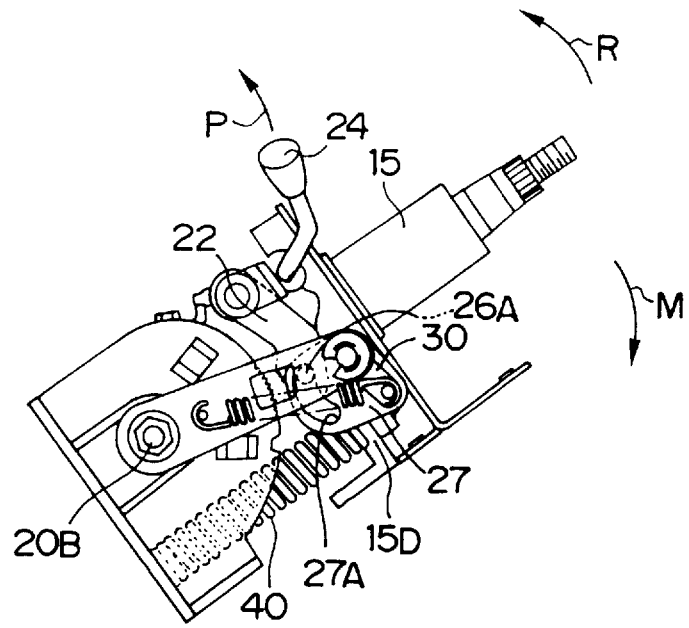
FIG. 7A is a side view illustrating an operational state of the tilt lever of the first embodiment, which shows a state in which the tilt lever is pulled up.

As illustrated in FIG. 7A, when the tilt lever 24 is rotated in the direction of arrow P and pulled upward, in an interlocking manner with the tilt cam 27, the pawl stopper 30 no longer pushes the reverse surface of the pawl 22 against the ratchet teeth 22A, and the pin 26A fit in the pawl 22 moves along the guide hole 27A of the tilt cam 27. Therefore, the ratchet teeth 22A of the pawl 22 illustrated in FIG. 4 separate from the ratchet teeth 20 of the steering support 20 so that the locking is canceled.

Figure 7B:
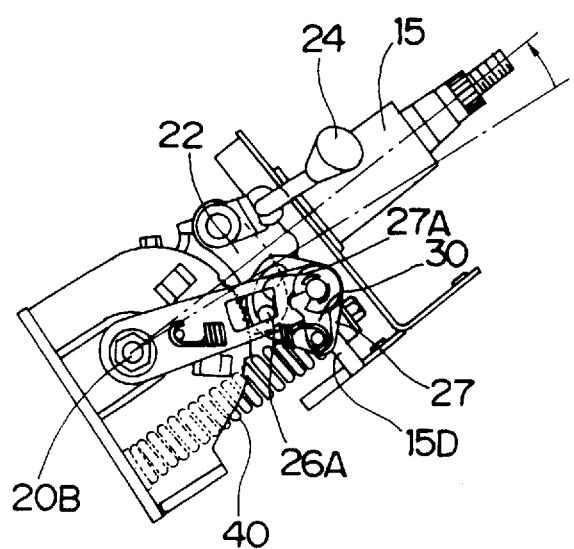
FIG. 7B is a side view illustrating an operational state of the tilt lever of the first embodiment, which shows a state in which the tilt lever is pulled down and locked.

In this way, the column upper tube 15 is, due to the urging force of the compression spring 40, rotated counterclockwise (in the direction of arrow R in FIG. 7A) around the center of rotation TC via an unillustrated joint. In this state, when the tilt lever 24 is returned to its original position (the position illustrated in FIG. 3A) after the steering wheel 12 is rotated around the center of rotation TC in the direction of arrow R or in the direction opposite to the direction of arrow R toward a desired position, the ratchet teeth 22A of the pawl 22 illustrated in FIG. 4 mesh with the ratchet teeth 20A of the steering support 20, and as illustrated in FIG. 7B, the column upper tube 15 is fixed.

Figure 8:
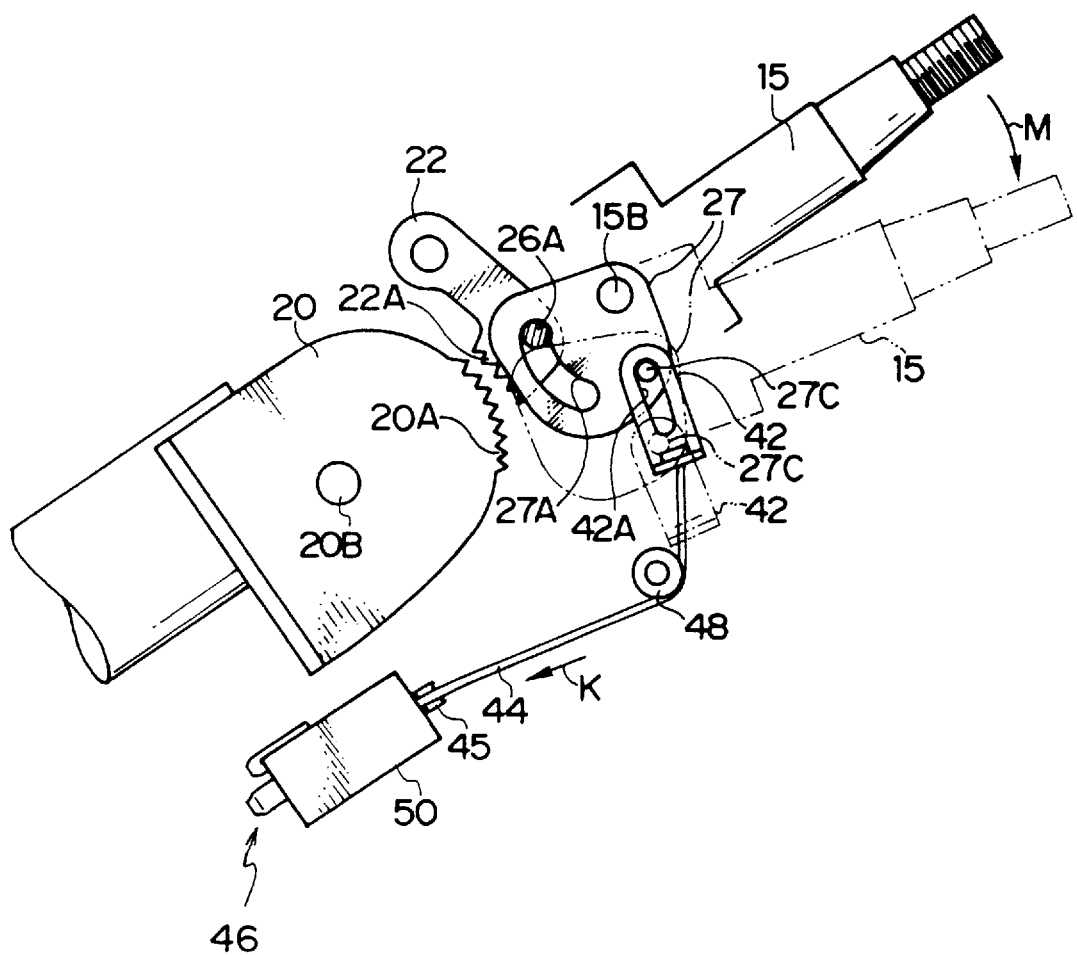
FIG. 8 is a schematic side view illustrating a state in which the pretensioner of the first embodiment is operated and a column upper tube (upper shaft) is rotated.

Next, when the vehicle suddenly decelerates, the pretensioner 46 is activated by the sensor 47 illustrated in FIG. 1, and the wire 44 is pulled in the direction of arrow K illustrated in FIG. 4. As a result, the tilt cam 27 rotates counterclockwise (in the direction of arrow W in FIG. 4), and as illustrated by the solid line in FIG. 8, the pin 26A abuts the end surface of the guide hole 27A. When the tilt cam 27 is rotated counterclockwise further, as illustrated in FIG. 8, the ratchet teeth 22A of the pawl 22 move apart from the ratchet teeth 20A of the steering support 20. More specifically, as illustrated by the imaginary line in FIG. 8, the column upper tube 15 is rotated clockwise (in the direction of arrow M in FIG. 8) around the center of rotation TC due to the tensile force of the wire 44, and the steering wheel 12 (see FIG. 1) is tilted the maximum amount toward the driver.

Figure 9A:
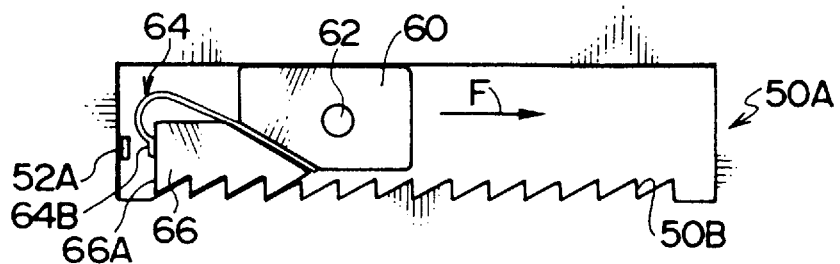
FIG. 9A is a side view illustrating an operational state of the lock mechanism of the first embodiment, which shows a state before operation of the pretensioner.
Figure 9B:
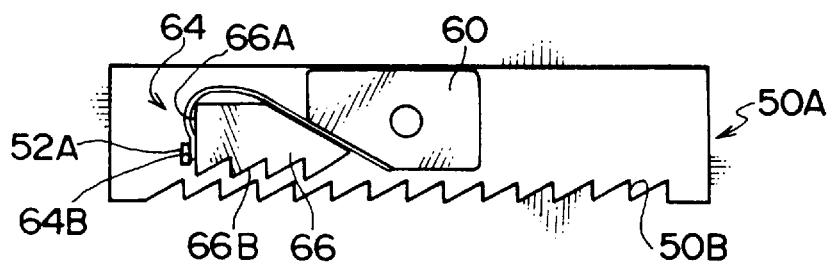
FIG. 9B is a side view illustrating an operational state of the lock mechanism of the first embodiment, which shows a state during operation of the pretensioner.
Figure 9C:
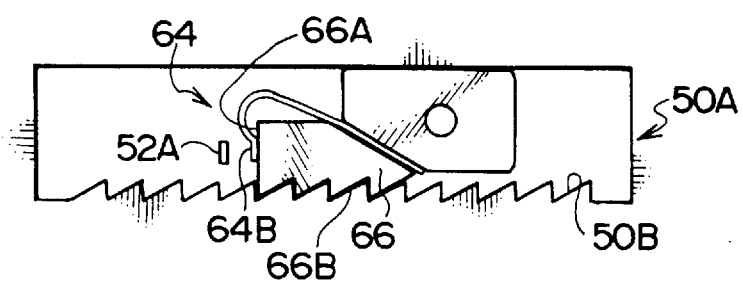
FIG. 9C is a side view illustrating an operational state of the lock mechanism of the first embodiment, which shows a state after operation of the pretensioner.

As illustrated in FIG. 9A, when the wire 54 is pulled, the lock member 60 of the lock mechanism of the pretensioner 46 slides in the direction of arrow F in FIG. 9A together with the slider 52 illustrated in FIG. 6, and the other end portion 64B of the plate spring 64 urges and moves the lock plate 66. When the slider 52 stops, as illustrated in FIG. 9B, the inertial force of the lock plate 66 and the other end portion 64B of the plate spring 64 urge the rear portion 66A of the lock plate 66. As a result, as illustrated in FIG. 9C, the ratchet teeth 66B of the lock plate 66 mesh with the ratchet teeth 50B of the base 50 so that the lock plate 66 is locked. Accordingly, the slider 52 does not return in the direction opposite to the direction of arrow F in FIG. 9A.

The air bag 90 expands during or after the column upper tube 15 rotates.

Accordingly, in accordance with the present first embodiment, when the vehicle suddenly decelerates, the steering wheel 12 is tilted toward the driver so as to oppose the driver. As a result, because the air bag 90 provided in the steering wheel 12 expands toward the driver, there is no need to make the capacity of the air bag 90 large or make the rigidity of the air bag 90 high.

Second Embodiment

Figure 10:
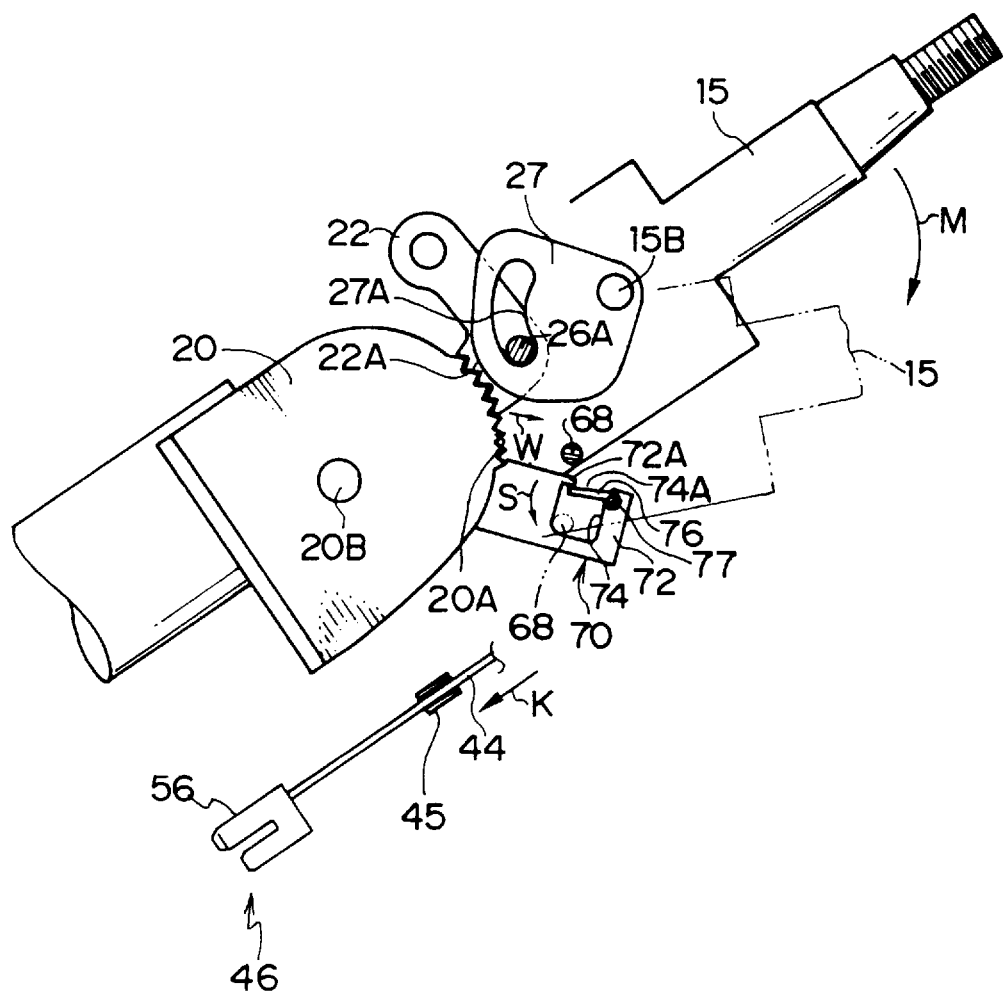
FIG. 10 is a schematic side view illustrating a lock mechanism of a second embodiment.

FIGS. 10 and 11 illustrate a second embodiment of the present invention. Structural portions which are substantially the same as those of the first embodiment are denoted by the same reference numerals, and description thereof is omitted. The present second embodiment as well is an example in which the pretensioner 46 is applied to a cab-over vehicle. Note that several of the members illustrated in FIG. 4, such as the pin 27C, the connecting member 42, and the like, have been omitted from FIGS. 10 and 11.

FIG. 10 illustrates main portions of a steering angle varying mechanism. In the present second embodiment, the return-preventing holding means is provided at the steering support 20. Accordingly, in the present embodiment, the return-preventing holding means is not disposed at the pretensioner 46.

As illustrated in FIG. 10, a lock mechanism 70 is disposed at the steering support 20. The lock mechanism 70 locks a lock pin 68 which is provided at the column upper tube 15 and which forms a portion of the holding means and whose axis is horizontal. The lock mechanism 70 includes a latch portion 72 which is provided on the locus of movement of the lock pin 68 which movement is caused by rotation of the column upper tube 15. An engagement hole 74 which engages the lock pin 68 is formed in the latch portion 72. A stopper portion 76, which forms a portion of the holding means, is provided at the latch portion 72 at an entrance 74A to the engagement hole 74.

As illustrated in FIG. 11, the stopper portion 76 can pivot around a pivot shaft 77 between the state illustrated by the solid line and the state illustrated by the imaginary line. The distal end of the stopper portion 76 engages an engaging projecting portion 72A of the latch portion 72 and cannot pivot clockwise (in the direction opposite to the direction of arrow S in FIG. 10) from the state illustrated in FIG. 10. Further, an unillustrated spring is disposed at the stopper portion 76. The stopper portion 76 is always urged clockwise by the spring. Other structures are the same as those of the first embodiment.

Operation of the present second embodiment will be described hereinafter.

When the vehicle suddenly decelerates, the pretensioner 46 is activated by an unillustrated sensor, which is disposed within the connected portion 58, such that the wire 44 is pulled in the direction of arrow K in FIG. 4. As a result, the tilt cam 27 rotates counterclockwise (in the direction of arrow W in FIG. 10), such that the pin 26A abuts the end surface of the guide hole 27A as illustrated by the solid line in FIG. 11. When the tilt cam 27 rotates further counterclockwise, as shown in FIG. 11, the ratchet teeth 22A of the pawl 22 separate from the ratchet teeth 20A of the steering support 20. More specifically, as illustrated by the imaginary line in FIG. 11, the column upper tube 15 rotates clockwise (in the direction of arrow M in FIG. 11) around the screw shaft 15B due to the tensile force of the wire 44, such that the steering wheel 12 (see FIG. 1) is tilted toward the driver.

As illustrated in FIG. 11, when the wire 44 is pulled and the lock pin 68 opposes the stopper portion 76 and the lock pin 68 moves further, the stopper portion 76 rotates counterclockwise (in the direction of arrow S in FIG. 11) against the urging force of the unillustrated spring. As a result, the lock pin 68 is inserted into the engagement hole 74, and the stopper portion 76 rotates clockwise (in the direction opposite to the direction of arrow S in FIG. 11) due to the urging force of the unillustrated spring. Accordingly, as illustrated by the imaginary line in FIG. 10, the lock pin 68 engages with the engagement hole 74, and the wire 44 does not return in the direction opposite to the direction of arrow K in FIG. 10.

The air bag 90 expands while the column upper tube 15 is rotating or after the lock pin 68 is locked by the lock mechanism 70 due to the rotation of the column upper tube 15.

Accordingly, in accordance with the second embodiment as well, when the vehicle suddenly decelerates, the steering wheel 12 is tilted toward the driver so as to oppose the driver. Therefore, the same effects as those of the first embodiment are achieved. Other operational effects are the same as those of the first embodiment as well.

In the above-described embodiments, collision acceleration is sensed by the electronic sensor 47. However, a mechanical collision acceleration sensor may be used in the same manner. Further, in the above embodiments, the pretensioner 46 is mounted to the column tube 14 which is a post portion. However, the pretensioner 46 may be mounted directly to the body portion.

In the above embodiments, a tilt mechanism, which can change and adjust the angle of the steering wheel during normal travel of the vehicle, is used as the means for changing the angle of the steering wheel at the time of a sudden deceleration of the vehicle. However, a tilt mechanism for changing the angle of the steering wheel only at times when the vehicle suddenly decelerates may be specially provided. In this case, a means for allowing a driver to arbitrarily change the steering angle, such as the tilt lever 24 or the like, is not provided.

While the embodiments of the present invention as herein disclosed constitute a preferred form, it is to be understood that other forms might be adopted.

What is claimed is:

1. A steering device equipped with an air bag, comprising:
   a steering wheel at which an air bag, which expands when a vehicle suddenly decelerates, is provided;
   driving means for tilting said steering wheel toward a driver when the vehicle suddenly decelerates;
   holding means for maintaining a tilted state of said steering wheel; and
   a tilt adjusting mechanism connected to said driving means which changes and adjusts an angle of said steering wheel at times when the vehicle is in an ordinary state, wherein said driving means includes a connected member connected to a region within said tilt adjusting mechanism which changes the angle of said steering wheel;
   a wire, one end of said wire being connected to said connected member; and
   a pretensioner connected to another end of said wire.

2. A steering device equipped with an air bag, comprising:
   a steering wheel at which an air bag, which expands when a vehicle suddenly decelerates, is provided;
   driving means for tilting said steering wheel toward a driver when the vehicle suddenly decelerates, said driving means including: a connected member connected to a region within said tilt adjusting mechanism which changes the angle of said steering wheel; a wire, one end of said wire being connected to said connected member; and a pretensioner connected to another end of said wire; and
   holding means for maintaining a tilted state of said steering wheel, said holding means including: a lock pin formed at an element which is integral with said steering wheel; and a lock mechanism formed at a fixed member, and when said steering wheel is tilted toward a driver, said lock mechanism engages with said lock pin so as to be unable to separate from said lock pin.

3. A steering device equipped with an air bag according to claim 2, wherein said region within said tilt adjusting mechanism is a tilt cam which is interlocked with a tilt lever provided within said tilt adjusting mechanism and operated in order to change and adjust the angle of said steering wheel.

4. A steering device equipped with an air bag according to claim 1, wherein said region within said tilt adjusting mechanism is a tilt cam which is interlocked with a tilt lever provided within said tilt adjusting mechanism and operated in order to change and adjust the angle of said steering wheel.

5. A steering device equipped with an air bag according to claim 1, wherein a collision acceleration sensor is connected to said pretensioner, and when said sensor detects a sudden deceleration of the vehicle, said pretensioner is operated so as to pull in said wire.

6. A steering device equipped with an air bag according to claim 1, wherein said holding means is provided at an intermediate portion of said wire, and said holding means includes:

- a base having a rectangular opening portion, ratchet teeth being formed at an inner periphery of said opening portion;
- a slider to which said wire is connected;
- a lock member connected to said slider, and inserted into said opening portion of said base, and moving together with said slider; and
- a lock plate connected to said lock member via a plate spring, and having ratchet teeth which engage with said ratchet teeth of said base.

7. A steering device equipped with an air bag according to claim 1, wherein said holding means includes:

- a lock pin formed at an element which is integral with said steering wheel; and
- a lock mechanism formed at a fixed member, and when said steering wheel is tilted toward a driver, said lock mechanism engages with said lock pin so as to be unable to separate from said lock pin.

8. A steering device equipped with an air bag according to claim 7, wherein said fixed member is a steering support provided within said tilt adjusting mechanism, and said element which is integral with said steering wheel is a column upper tube provided within said tilt adjusting mechanism and rotatably shaft-supported at said steering support.

9. A steering device equipped with an air bag according to claim 7, wherein said lock mechanism includes:

- an engagement hole disposed on a locus of movement of said lock pin which movement is caused by tilting of said steering wheel toward a driver, said engagement hole engaging said lock pin; and
- a stopper portion provided at an entrance to said engagement hole.

10. A steering device equipped with an air bag according to claim 1, wherein when the vehicle suddenly decelerates, before the air bag expands, said driving means tilts said steering wheel toward a driver.

11. A steering device equipped with an air bag, comprising:

- a steering wheel at which an air bag, which expands when a vehicle suddenly decelerates, is provided;
- driving means for tilting said steering wheel toward a driver when the vehicle suddenly decelerates, said driving means including: a connected member connected to a region within said tilt adjusting mechanism which changes the angle of said steering wheel; a wire, one end of said wire being connected to said connected member; and a pretensioner connected to another end of said wire; and
- holding means provided at an intermediate portion of said wire so as to maintain a tilted state of said steering wheel, said holding means including: a base having a rectangular opening portion, ratchet teeth being formed at an inner periphery of said opening portion; a slider to which said wire is connected; a lock member connected to said slider, and inserted into said opening portion of said base, and moving together with said slider; and a lock plate connected to said lock member via a plate spring, and having ratchet teeth which engage with said ratchet teeth of said base.

12. A steering device equipped with an air bag according to claim 11, wherein said region within said tilt adjusting mechanism is a tilt cam which is interlocked with a tilt lever provided within said tilt adjusting mechanism and operated in order to change and adjust the angle of said steering wheel.

13. A steering device equipped with an air bag according to claim 11, wherein a collision acceleration sensor is connected to said pretensioner, and when said sensor detects a sudden deceleration of the vehicle, said pretensioner is operated so as to pull in said wire.

14. A steering device equipped with an air bag according to claim 11, wherein when the vehicle suddenly decelerates, before the air bag expands, said driving means tilts said steering wheel toward a driver.

15. A steering device equipped with an air bag according to claim 2, wherein a collision acceleration sensor is connected to said pretensioner, and when said sensor detects a sudden deceleration of the vehicle, said pretensioner is operated so as to pull in said wire.

16. A steering device equipped with an air bag according to claim 2, wherein said fixed member is a steering support provided within said tilt adjusting mechanism, and said element which is integral with said steering wheel is a column upper tube provided within said tilt adjusting mechanism and rotatably shaft-supported at said steering support.

17. A steering device equipped with an air bag according to claim 2, wherein said lock mechanism includes:

- an engagement hole disposed on a locus of movement of said lock pin which movement is caused by tilting of said steering wheel toward a driver, said engagement hole engaging said lock pin; and
- a stopper portion provided at an entrance to said engagement hole.

18. A steering device equipped with an air bag according to claim 2, wherein when the vehicle suddenly decelerates, before the air bag expands, said driving means tilts said steering wheel toward a driver.

19. The steering device equipped with an airbag according to claim 1, further comprising:

- a steering column tube; and
- a steering support fixed to the steering column tube, wherein the driving means further includes a pawl which, in an ordinary state of the vehicle, engages with the steering further support, the pawl disengaging from the steering support when the vehicle suddenly decelerates.

* * * * *

UNITED STATES PATENT AND TRADEMARK OFFICE
CERTIFICATE OF CORRECTION

PATENT NO. : 5,871,233
DATED : February 16, 1999
INVENTOR(S) : Hideki TANAKA and Katsuo SAKURAI It is certified that error appears in the above-identified patent and that said Letters Patent is hereby corrected as shown below:

ON THE TITLE PAGE:

Item [56], Foreign Patent Documents:

"B2-260550" to --B2-2-60550-- and "A-117612" to --A-7-117612--.

Signed and Sealed this

Tenth Day of August, 1999

Attest:

Q. TODD DICKINSON

Attesting Officer

Acting Commissioner of Patents and Trademarks